US007305340B1

(12) United States Patent
Rosen et al.

(10) Patent No.: US 7,305,340 B1
(45) Date of Patent: Dec. 4, 2007

(54) SYSTEM AND METHOD FOR CONFIGURING VOICE SYNTHESIS

(75) Inventors: Kenneth H. Rosen, Middletown, NJ (US); Carroll W. Creswell, Basking Ridge, NJ (US); Jeffrey J. Farah, North Brunswick, NJ (US); Pradeep K. Bansal, Monmouth Junction, NJ (US); Ann K. Syrdal, Morristown, NJ (US)

(73) Assignee: AT&T Corp., New York, NY (US)

( * ) Notice: Subject to any disclaimer, the term of this patent is extended or adjusted under 35 U.S.C. 154(b) by 759 days.

(21) Appl. No.: 10/162,932

(22) Filed: Jun. 5, 2002

(51) Int. Cl.
*G10L 13/00* (2006.01)
*G10L 15/00* (2006.01)

(52) U.S. Cl. ...................... 704/258; 704/275; 704/260; 704/270

(58) Field of Classification Search ................. 704/271
See application file for complete search history.

(56) References Cited

U.S. PATENT DOCUMENTS

| | | | | |
|---|---|---|---|---|
| 5,305,420 | A * | 4/1994 | Nakamura et al. | 704/271 |
| 6,035,273 | A * | 3/2000 | Spies | 704/270 |
| 6,240,347 | B1 * | 5/2001 | Everhart et al. | 701/36 |
| 6,725,199 | B2 * | 4/2004 | Brittan et al. | 704/258 |
| 6,810,379 | B1 * | 10/2004 | Vermeulen et al. | 704/260 |
| 7,110,951 | B1 * | 9/2006 | Lemelson et al. | 704/270 |
| 2002/0152255 | A1 * | 10/2002 | Smith et al. | 709/102 |
| 2003/0061049 | A1 * | 3/2003 | Erten | 704/260 |

* cited by examiner

*Primary Examiner*—V. Paul Harper

(57) ABSTRACT

Systems and methods for providing synthesized speech in a manner that may take into account the environment where the speech is presented. In certain cases, the manner in which speech is presented can take into consideration ambient noise and/or can seek to optimize speech audibility.

71 Claims, 4 Drawing Sheets

SYSTEM AND METHOD FOR CONFIGURING VOICE SYNTHESIS

FIELD OF INVENTION

This inventions relates to systems and methods for providing synthesized speech.

BACKGROUND INFORMATION

The use of voice synthesis in various applications appears to be increasing. For example, airlines increasing provide telephone numbers which a user can call in order to hear flight arrival and departure information presented as synthesized speech. As another example, many computer and software manufactures now offer telephone numbers which provide user help and/or technical documents as synthesized speech. Also introduced have been telephone numbers that a user can call in order to hear web content presented using voice synthesis. Furthermore, there are vending machines, such as airline and train ticket vending kiosks, that use synthesized speech to communicate with users.

Accordingly, there may be increased interest in technologies that allow synthesized speech to be presented in an effective manner.

SUMMARY OF THE INVENTION

According to embodiments of the present invention, there are provided systems and methods for providing synthesized speech in a manner that may take into account the environment where the speech is presented.

In certain embodiments, the manner in which speech is presented might take into consideration ambient noise and/or might seek to optimize speech audibility.

DETAILED DESCRIPTION OF THE INVENTION

General Operation

Embodiments of the present invention provide systems and methods for speech synthesis that take into account the environment where the speech is presented, in certain embodiments with the goal of improving the audibility and/or understandability of the speech. Such systems and methods may be applicable, for example, in providing synthesized speech to a user via telephone, wireless device, or the like.

As an exemplary implementation, the manner in which synthesized speech is presented to a user might depend upon the ambient noise present in the user's environment. It is specifically noted, however, that environmental factors and/or aspects other than ambient noise may be taken into account.

Figure 1:
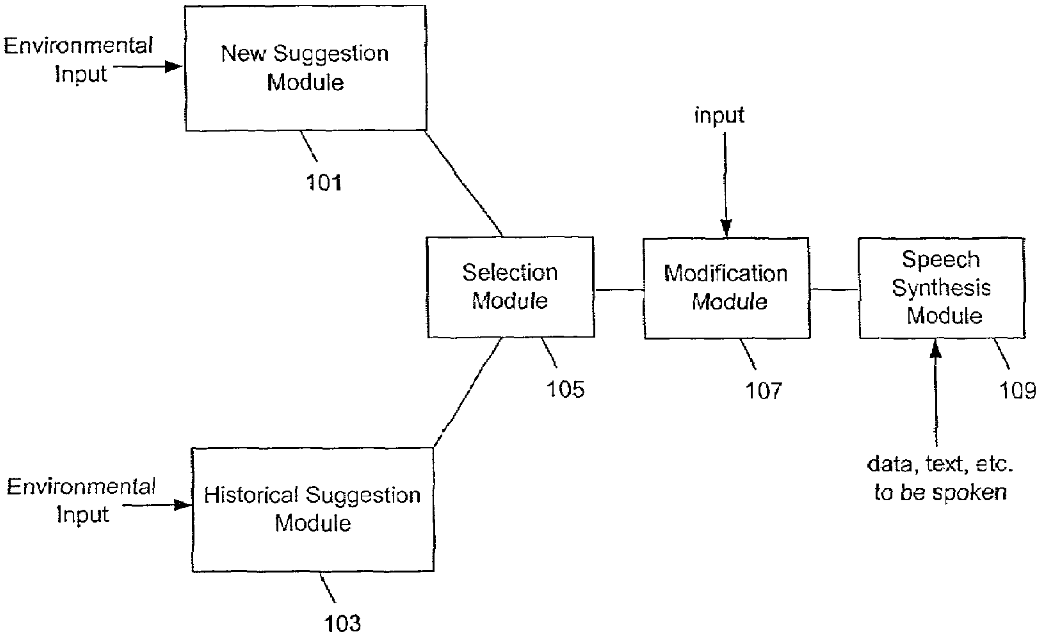
FIG. 1 is a view showing exemplary software modules employable in various embodiments of the present invention.

FIG. 1 is a an exemplary view showing software modules employed various embodiments of the invention. It is specifically noted that with regard to various embodiments one or more of the modules shown may not be employed. It is further noted that certain embodiments may employ more than one of any of the shown modules.

Shown in FIG. 1 are suggestion modules 101 and 103. According to various embodiments of the invention such suggestion modules may receive input relating to the environment for presenting synthesized speech and suggest how a speech synthesis module should present that speech. As will be discussed in greater detail below, a new suggestion module may make its suggestion based on a new determination of which presentation is most appropriate for the environment, whereas a historical suggestion module may make its suggestion based on predetermined and/or precompiled notions of which presentations are most appropriate for various embodiments. In is noted that embodiments of the invention may utilize suggestion modules that employ other approaches in the determination of how speech should be presented.

Also shown in FIG. 1 is selection module 105. A selection module may, according to various embodiments of the invention, receive suggestions from one or more suggestion modules and employ the suggestions in determining a directive regarding how a speech synthesis module should present speech. According to embodiments of the invention, the directive could be passed directly to a speech synthesis module, which, as will be described in greater detail below, could act in accordance with the specification.

Further shown in FIG. 1 is modification module 107. According to certain embodiments, a directive dispatched by a selection module might first be dispatched to a modification module. The receiving modification module could act to modify and/or append to the directive in accordance with instructions, comments, and/or the like provided by, for example, a system administrator or user to which speech is being or will be presented. Such a user might, for instance, indicate that presented speech become slower. In is noted that in certain embodiments there may be no selection module, and a suggestion module might pass its suggestion directly to a modification module or a speech synthesis module. Such might be the case, for instance, in embodiments that employ only one suggestion module (e.g., only a historical suggestion module and no new suggestion module).

Also shown in FIG. 1 is speech synthesis module 109. A speech synthesis module may receive via a software module, database, remote computer, system operator, or the like an indication of data, text, or the like that should be present using synthesized speech. The indication may be, for example, specified as linguistic text (e.g., English text) or in phonetic form. As a specific example, a synthesis module may receive text describing flight departure times. As alluded to above, a speech synthesis module may additionally receive a directive specifying how the speech should be presented.

A speech synthesis module may, in accordance with embodiments of the presentation invention, maintain and/or have access do a bank of phonemes, words and/or other components from which speech can be constructed. In certain embodiments, the phonemes or the like may be grouped into classes. The bank might contain multiple versions of various particular phonemes, words, components and/or the like. Thus the bank might maintain versions of a particular phoneme that are of varying durations, pitches, intensities, and/or the like.

A speech synthesis module might, by choosing appropriate phonemes or the like from the bank, formulate speech corresponding to the indication of what should be spoken. As just noted, the bank might possess more than one version of each phoneme or the like. In accordance with embodiments of the invention, the speech synthesis module could employ a received directive to determine which versions of phonemes or the like or classes thereof should be employed.

Various aspects of the present invention will now be described in greater detail.

New Suggestion Module

Figure 2:
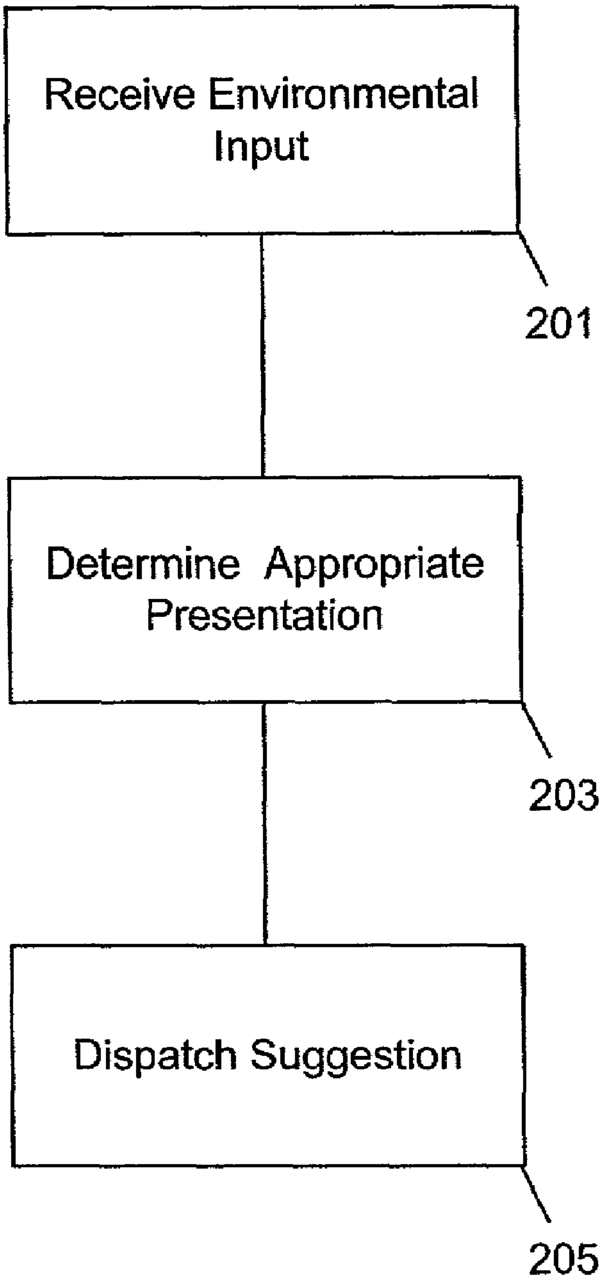
FIG. 2 is a flow chart illustrating operations which may be performed by a new suggestion module according to embodiments of the present invention.

As noted above, a new suggestion module may receive input relating to an environment for presenting synthesized speech and make a suggestion as to how a speech synthesis module should present that speech, the suggestion based on a new determination of which speech presentation is most appropriate for the environment. Such a suggestion could specify various entities (i.e., phonemes or the like or classes thereof). FIG. 2 illustrates certain operations that may be performed by a new suggestion module.

In some cases the input received could be in the form of matrices or the like corresponding to spectral and/or other properties of the environment. The matrices could, for example, correspond to spectral proprieties of the ambient noise in the environment. In other embodiments, the module might receive direct environmental input (such as ambient noise sensed by a microphone or the like) and create its own corresponding matrices or the like.

Furthermore, in certain embodiments of the invention, there may be matrices or the like corresponding to characteristic spectral and/or other properties of various entities in the bank of a speech synthesis module. Such matrices or the like could be held in a store associated, for example, with the speech synthesis module or a new session module. The characteristic properties corresponding to a particular class of phonemes or the like could be, for example, the spectral properties relating to that class when employed to synthesize one or more chosen test words and/or sounds in an effectively noiseless environment. Similarly, the characteristic properties corresponding to one or more particular phonemes or the like could be, for example, the spectral properties of the one or more particular phonemes or the like when employed to synthesize one or more chosen test words and/or sounds in an effectively noiseless environment. The test words and/or sounds could be chosen by a sound and/or hearing expert such as an audiologist, physician, or recording engineer so as to effectively characterize the class, phoneme, phonemes, or the like.

Accordingly, a new suggestion module receiving input relating to an environment (step 201 of FIG. 2) may act to determine the presentation most appropriate for that environment by considering the matrices or the like corresponding to the environment in light of the matrices or the like corresponding to various entities (step 203). The new suggestion module might declare a match between an entity and the environment in the case where the consideration shows that the use of the entity could provide at least a threshold level of audibility. In the case where matches were declared for two or more mutually exclusive entities (e.g., for two versions of the same phoneme or for two phoneme classes with comparably-rich phoneme vocabularies), the entity providing the highest level of audibility could be chosen. In some embodiments, determination of audibility might take into consideration the connection type, connection characteristics, and/or connection bandwidth employed in speech presentation. Accordingly, determination for presentation via conventional analog telephone could differ from determination for presentation via VOIP (Voice over Internet Protocol)

Audibility might be determined, for example, by considering the spectral difference between one or more matrices corresponding to an environment's ambient noise and one or more matrices corresponding to the characteristic spectral properties of an entity. A match could be declared, for example, when the spectral difference was found to be positive beyond a certain predetermined threshold. According to various embodiments, the algorithm employed may take into account the connection type and/or bandwidth employed in speech presentation. It is further noted that, in certain cases, the consideration of spectral difference could be frequency weighted, perhaps considering normal human auditory perception. Physiological and/or psychological aspects of perception could be considered. In certain embodiments, abnormal human auditory perception could be considered in order to more effectively meet the needs of a hearing impaired user. In such embodiments, a user may be able to make a new suggestion module aware of the nature of her impairment. For example, at the start of a session employing the present invention, a user could provide a user identifier and/or password, perhaps via a telephone microphone or microphone used by the new suggestion module for receiving environmental input. The new suggestion module could use the provided information to consult a central server containing information about the user's impairment. Steps might be taken, in some embodiments, so that the process could take place without divulging the identity of the user. It is specifically noted that the consideration of normal and/or abnormal human auditory perception in determining audibility is noted limited to the case where the determination involves consideration of spectral difference.

Having made a determination of how a speech synthesis module should present speech to the environment, a new suggestion module could dispatch a corresponding suggestion to, for instance, a selection module (step 205). The suggestion could include, for example, a specification of one or more entities employable in presenting the speech. In embodiments of the present invention, the suggestion could include an indication of the level of audibility of each specified entity. As alluded to above, in the case where matches are declared for two or more mutually exclusive entities, the entity providing the highest level of audibility could be chosen for inclusion in the suggestion.

Historical Suggestion Module

Figure 3:
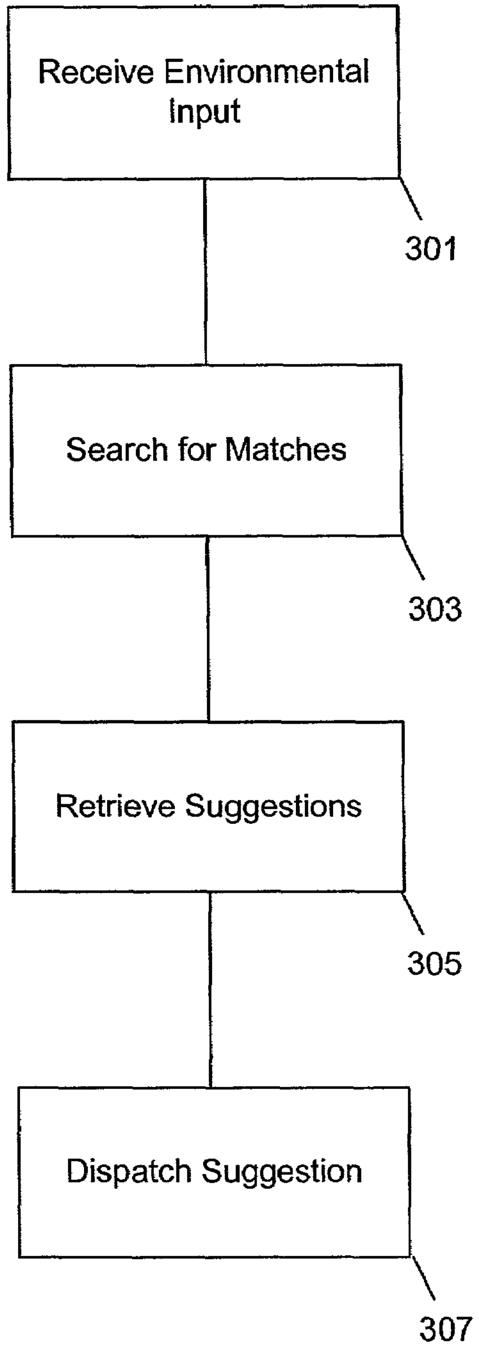
FIG. 3 is a flow chart illustrating operations which may be performed by a historical suggestion module according to embodiments of the present invention.

As noted above, a historical suggestion module may receive input relating to an environment for presenting synthesized speech and make a suggestion as to how a speech synthesis module should present that speech, the suggestion based on predetermined and/or precompiled notions of which presentations are most appropriate for various environments. Such a suggestion could specify various entities (i.e., phonemes or the like or classes thereof). FIG. 3 illustrates certain operations that may be performed by a historical suggestion module.

More specifically, a historical selection module, upon receiving environmental input (step 301 of FIG. 3), could consult a database, store, or the like to learn of the synthesized speech presentation that had been determined and/or decided to be most appropriate for the environment. In some cases the input received could be in the form of matrices or the like corresponding to spectral and/or other properties of the environment. The matrices could, for example, correspond to spectral properties of ambient noise in the environment. In other embodiments, the module might receive direct environmental input (such as ambient noise sensed by a microphone or the like) and create its own corresponding matrices or the like.

The database or the like could, for example, hold correlations between speech presentation suggestions and matrices or the like corresponding to properties. Accordingly, a historical suggestion module might search the database or the like for the matrices or the like most closely matching the matrices or the like corresponding to the sensed environment (step 303). The historical suggestion module could then retrieve from the database the corresponding presentation suggestion or suggestions (step 305).

The algorithm for finding a closest match could be designed by an audio expert, statistician, or the like. In certain embodiments the matching algorithm might take into account physiological, psychological, and/or other aspects of human auditory or other perception so that a match would be determined between two sets of matrices or the like in the case where the corresponding environmental conditions would be perceived similarly by a human. In the case where environmental properties related partially or totally to ambient noise conditions, the matching algorithm might be frequency-weighted or otherwise weighted in a manner that bore in mind human auditory perception. As will be discussed in greater detail below, in certain embodiments, abnormal human perception could be taken into account in order to more effectively meet the needs of a hearing impaired user.

The database or the like could be compiled, for example, through user testing. Users could be subjected to various environmental conditions and made to listen to synthesized speech presented in a number of varying ways. The various environmental conditions could, for instance, be different ambient sound conditions, while the varying ways of presenting synthesized speech could correspond to the use of varying versions of individual phonemes, words, and/or other components, or classes thereof. The users could be asked which presentations provided the most audible speech, and the results could be assembled and/or statistically analyzed in order to determine correlations between presentations and environmental properties. An expert, such as an audiologist, physician, or recording engineering, might play a role in determining the correlations. Additionally or alternately, a computer may be employed in making the correlations.

As a next step, the banks of speech synthesis modules might next be loaded with the entities (e.g., phonemes or classes thereof) found during testing to provide audible speech with regard to certain environmental properties. Such loading might not be necessary for a particular speech synthesis module in the case where the entities were already available to the module. Such might be the case, for example, if the test users were only made to experience presentations already producible by one or more speech synthesis modules.

As alluded to above, in various embodiments abnormal human auditory or other perception could be considered. In such embodiments, a user might be able to make a historical suggestion module aware of the nature of her impairment in a manner analogous to that described above with reference to a new suggestion module. In such embodiments, the above-noted user testing might be performed with respect to both unimpaired users and users with varying impairments. Accordingly, the database or the like could be made to hold not only correlations corresponding to testing of unimpaired users, but also correlates corresponding to users of various specific impairments, classes of impairment, or the like. Thus a historical suggestion module could consult the appropriate correlation or correlations for a user's specified impairment.

It is noted that, in a manner perhaps analogous to that described with reference to abnormal human perception, the connection type and/or bandwidth employed in speech presentation could be considered. Accordingly, the database or the like could be made to hold not only correlations of the sort noted above, but also correlations corresponding to various connection types, connection bandwidths, and the like employable in speech presentation.

It is further noted that, in certain embodiments, the actions of an audio expert might be used in place of user testing. Thus a recording engineer or other expert might design and/or select phonemes or the like that she determined and/or decided to provide audible speech for particular environmental situations, and it would be these entities that could be provided to speech synthesis modules as necessary.

Once a historical suggestion module has made a determination of how a speech synthesis module should present speech to the environment, the historical suggestion module could dispatch the corresponding suggestion to, for example, a selection module (step 307). As alluded to above, the suggestion could include, for example, a specification of one or more entities. Furthermore, as stated above, in formulating the suggestion databases or the like may have been searched for one or more closest matches relating to inputted environmental conditions. Further to this, it is noted that in certain embodiments of the invention a dispatched suggestion could include an indication of the closeness of each such match.

Selection Module

As noted above, a selection module may receive suggestions from one or more suggestion modules and employ these suggestions in determining a directive relating to how a speech synthesis module should present speech. The determined directive could be passed to a speech synthesis module or modification module.

In certain embodiments of the invention, it might be desired that there be a limit on the frequency with which a selection module dispatches directives to a modification module or speech synthesis module. Such might be the case, for example, where it was decided that there should be some restriction as to how often a speech synthesis module should change the way in which it presents speech. Such functionality may be implemented, for example, by stipulating that a selection module dispatch directives at a stipulated frequency.

It is further noted that certain embodiments could allow a user, system administrator, or the like to override such a frequency requirement by commanding a selection module to formulate and dispatch a directive. Such functionality could, for example, allow a user receiving presented speech in a manner she found unsatisfactory to have a new (and perhaps different) directive dispatched without having to wait for a directive to be automatically dispatched in accordance with the specified frequency.

Certain embodiments of the invention might allow a user or the like to directly request that a new directive be dispatched, perhaps by saying something to the effect of “please speak differently” or “please choose a new voice”. Embodiments might also allow a user or the like to indirectly request that a new directive be dispatched, perhaps by saying something to the effect of “huh?” or “what?” or “I don’t understand!”. In the case where such a statement is spoken by the user to which synthesized speech is being presented, the statement might be received via a microphone or the like, such as a microphone or the like used to receive environmental input, and could be processed via known speech recognition techniques. In a similar manner, a system administrator or the like might speak such a command into a microphone for processing via speech recognition. Alternately, a user, system administrator, or the like might enter such a command, for example, through a device or telephone keyboard, keypad, menu, user interface, or the like.

It is further noted that embodiments of the present invention provide functionality wherein a selection module may, in formulating and dispatching a directive, choose to override a frequency requirement of the sort noted above. For instance, in the case where interactive speech is presented to a user, a selection module might act to override a frequency requirement if the user failed to respond to interactive speech voice prompts, and/or responded in a nonsensical manner.

In terms of formulating a particular directive as to how speech should be presented, according to some embodiments of the invention a selection module may act to accept all of the most recently received suggestions dispatched by a particular suggestion module. In such embodiments, there are a number of ways in which a selection module could choose which suggestion module’s suggestions should be implemented.

For instance, as alluded to above a suggestion module might include with its suggestion some sort of the certitude of its suggestion. As a specific example, it was noted that a new suggestion module might include with a suggestion an indication of the perceived level of audibility of each entity specified in the suggestion. Accordingly, a selection module might choose to implement the suggestions of the suggestion module that expressed the higher level of certitude in its suggestions. In various embodiments of the invention, a system designer, system administrator, or the like could specify how a selection module should handle the case where two suggestion modules expressed equal levels of certitude.

For example, it might be specified that one sort of suggestion module be favored in ties. More specifically, it might be specified that, in the case of a tie between the level of certitude expressed by a historical suggestion module and some other sort of suggestion module, that the selection module should choose to implement the suggestions of the historical suggestion module. It is further noted that a system designer, system administrator, or the like might specify that a selection module apply certain weightings when evaluating the certitudes expressed by various suggestion modules. For example, it might be specified that certitudes expressed by new suggestion modules be viewed with a weighting of 1.0 while certitudes expressed by a historical selection module be viewed with a weighting of 1.3.

As another example, a system designer, system administrator, or the like might stipulate that a selection module should, instead of comparing the certitudes expressed by various suggestion modules, preferentially implement the suggestions of a specified suggestion module. For instance, it might be stipulated that in the case where a selection module receives suggestions from a historical suggestion module and one or more suggestion modules that are not historical suggestion modules, the selection module’s dispatched directive should comprise only the suggestions of the historical suggestion module. As related example, such a stipulation might further indicate that the suggestions of the preferred module should only be implemented in the case where the level of certitude expressed by the preferred suggestion module is above a predetermined threshold.

In certain embodiments, a selection module may allow a user receiving presented speech to choose among various presentations. For instance, a selection module might have a voice synthesis module present a sample phrase or the like in various ways. The ways could, for example, correspond to suggestions received from various suggestion modules. The selection module might then query the user as to which way was best, and dispatch a directive consistent with the user’s selection.

It is further noted that, in some embodiments, a selection module might dispatch a directive that includes suggestions of more than one suggestion module. Thus a directive might be dispatched that included certain suggestions dispatched by a new suggestion module and certain suggestions dispatched by a historical module. As an example, suppose certain phonemes were specified by a first suggestion module and some of the same phonemes were specified by a second suggestion module, with a each module providing specification of certitude for each phoneme. For each case where a version of a certain phoneme was specified by the first suggestion module, and a different version of the same phoneme was specified by the second suggestion module, the selection module might select the version of the phoneme associated with a higher specified certitude. Accordingly, the selection module might assemble a directive specifying certain phonemes suggested by the first suggestion module and certain phonemes suggested by the second suggestion module.

Modification Module

As noted above, certain embodiments of the invention may employ a modification module. Such a modification module may act to modify a directive dispatched by a selection module before passing the directive on to a speech synthesis module. In certain embodiments, the modification could be in accordance with input received from a user, system administrator, or the like. Such an input might request, for example, that presented speech be lower, softer, slower, higher pitched, or lower pitched.

A modification module could have knowledge of the bank of entities associated with the synthesis module with which it communicates. Accordingly, upon receiving an instruction to modify presented speech, the modification module could examine a directive received form a selection module and note, for example, the entities specified in the directive. Using its knowledge of the speech synthesis module’s bank, the modification module could determine entities in the bank that differed, in the manner specified in the received instruction, from the ones specified by the directive. The modification module could then dispatch to the speech synthesis module a version of the directive modified to specify the determined entities.

As a specific example, if a modification module received an instruction that the presented speech should be faster, the modification module could note the phonemes or classes thereof specified in the directive received from the corresponding selection module. The modification module could then employ its knowledge of the bank of the speech synthesis module with which it communicates in modifying the directive to specify phonemes or classes thereof that were similar to the ones originally specified but which differed by offering faster speech presentation. The modified directive could then be dispatched to the speech synthesis module. The newly-specified phonemes might differ from the ones originally specified insofar as generating sounds of shorter duration.

In certain embodiments, a modification module might not modify received directives to specify entities different than those originally specified. Instead, a modification module might append to a received directive signal processing commands. Accordingly, in such embodiments a modification module receiving instructions to speed up speech presentation might append to a received directive an appropriate signal processing command. The receiving speech synthesis module could interpret the directive with appended command to specify that it should speed up speech presentation by applying signal processing to the specified entities. Such signal processing could employ known techniques for achieving the specified presentation change.

According to further embodiments, a modification module might implement certain received instructions by modifying directives to specify different entities, but may implement other instructions by appending signal processing commands. For example, a modification module might carry out instructions for louder or softer speech by appending one or more signal processing commands, but carry out all other instructions by directive modification. As another example, a modification module might attempt to carry out all received instructions via directive modification but, in the case where an instruction could not be fulfilled via directive modification, fulfill it via a signal processing command. Such might occur, for example, in the case where the corresponding speech synthesis module did not have in its banks the appropriate entities to implement an instruction received by the modification module.

It is further noted that certain embodiments of the invention could allow a user, system administrator, or the like to use speech input to provide to a modification module the previously-noted instructions regarding the way in which speech presentation should be changed. Thus a user, system administrator, or the like might provide instructions by stating phrases to the effect of, for example, “talk faster ”, “talk slower”, “talk softer”, “talk louder”, “talk more high-pitched”, “talk lower pitched”, “speak like a woman”, or “speak like a man”. In the case where such an instruction was spoken by the user to which synthesized speech is being presented, the instruction might be received via a microphone or the like, such as a microphone or the like used to receive environmental input. The received instruction could be processed via known speech recognition techniques. In a similar manner, a system administrator or the like might speak such an instruction into a microphone for processing via speech recognition. Alternately, a system administrator or user might enter such a command through a keyboard, keypad, menu, or the like, perhaps associated with a telephone or device.

It is additionally noted that in various embodiments a modification module might send to one or more suggestion modules information relating to modifications made. In such embodiments, the receiving suggestion modules might use the information to provide more appropriate suggestions in the future.

Hardware and Software

Certain aspects of the present invention may be implemented using computers. For example, the above-noted suggestion modules, selection modules, identification modules, and/or speech synthesis modules may be implemented as software modules running on computers. For example, one or more of these modules could operate on a call-center computer having a telephone interface whereby speech could be presented to a dial-in user via the earpiece of the user’s telephone, and whereby commands and environmental properties could be received via the mouthpiece of the user’s telephone. In a similar manner, one or more of the modules could operate on a kiosk or vending machine computer having audio input and output capabilities. Furthermore, various procedures and the like described herein may be executed by or with the help of computers.

The phrases “computer”, “general purpose computer”, and the like, as used herein, refer but are not limited to a media device, a personal computer, an engineering workstation, a call-center, a PC, a Macintosh, a PDA, a kiosk, a vending machine, a wired or wireless terminal, a server, a network access point, or the like, perhaps running an operating system such as OS X, Linux, Darwin, Windows XP, Windows CE, Palm OS, Symbian OS, or the like, possible with support for Java or .NET.

Figure 4:
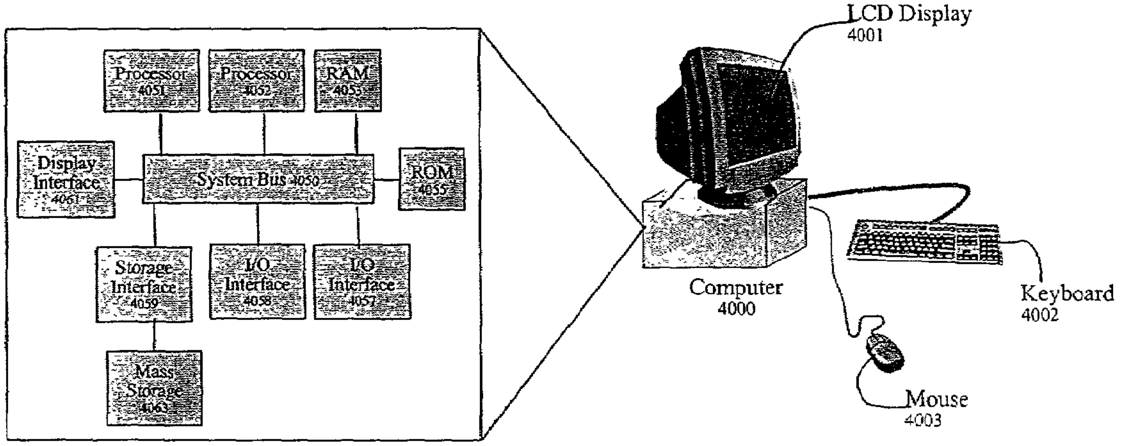
FIG. 4 shows an exemplary general purpose computer employable in various embodiments of the present invention.

The phrases “general purpose computer”, “computer”, and the like also refer, but are not limited to, one or more processors operatively connected to one or more memory or storage units, wherein the memory or storage may contain data, algorithms, and/or program code, and the processor or processors may execute the program code and/or manipulate the program code, data, and/or algorithms. Accordingly, exemplary computer 4000 as shown in FIG. 4 includes system bus 4050 which operatively connects two processors 4051 and 4052, random access memory (RAM) 4053, read-only memory (ROM) 4055, input output (I/O) interfaces 4057 and 4058, storage interface 4059, and display interface 4061. Storage interface 4059 in turn connects to mass storage 4063. Each of I/O interfaces 4057 and 4058 may be an Ethernet, IEEE 1394, IEEE 802.11b, Bluetooth, DVB-T, DVB-S, DAB, GPRS, UMTS, or other interface known in the art. Mass storage 4063 may be a hard drive, optical drive, or the like. Processors 4057 and 4058 may each be a commonly known processor such as an IBM or Motorola PowerPC, an AMD Athlon, an AMD Hammer, a Transmeta Crusoe, and Intel StrongARM, an Intel Itanium or an Intel Pentium. Computer 4000 as shown in this example also includes an LCD display unit 4001, a keyboard 4002 and a mouse 4003. In alternate embodiments, keyboard 4002 and/or mouse 4003 might be replaced with a touch screen, pen, or keypad interface. Computer 4000 may additionally include or be attached to card readers, DVD drives, or floppy disk drives whereby media containing program code may be inserted for the purpose of loading the code onto the computer.

In accordance with the present invention, a computer may run one or more software modules designed to perform one or more of the above-described operations, the modules being programmed using a language such as Java, Objective C, C, C#, or C++ according to methods known in the art.

Ramification and Scope

Although the description above contains many specifics, these are merely provided to illustrate the invention and should not be construed as limitations of the invention’s scope. Thus it will be apparent to those skilled in the art that various modifications and variations can be made in the system and processes of the present invention without departing from the spirit and scope of the invention.

What is claimed is:

1. A method for configuring speech synthesis, comprising:

based on a listening environment and an analysis of connection characteristics associated with presenting speech, selecting an approach from a plurality of approaches for presenting the speech in the environment;

presenting speech according to the selected approach; and based on natural language input related to a user's inability to understand the presented speech, selecting a second approach from the plurality of approaches and presenting the speech using the second approach.

2. The method of claim 1, wherein said environment has ambient noise.

3. The method of claim 1, wherein the determined approach provides speech audible in said environment.

4. The method of claim 3, wherein the speech is audible to a listener of normal hearing capability.

5. The method of claim 3, wherein the speech is audible to a listener of abnormal hearing capability.

6. The method of claim 1, wherein the natural language input comprises further comprises explicitly instructions to modify the determined approach.

7. The method of claim 1, further comprising:

modifying said approach in accordance with instructions provided by a system administrator.

8. The method of claim 1, wherein said method is performed in response to a trigger.

9. The method of claim 8, wherein said trigger is an indication that said speech is not audible.

10. The method of claim 1, wherein said method is performed periodically.

11. The method of claim 10 wherein method is performed with a periodicity that prevents said approach from changing rapidly.

12. The method of claim 1, wherein determining the approach comprises:

evaluating, in light of properties relating to said environment, characteristic properties relating to various entities employable in constructing synthesized speech;

selecting, from said various entities, one or more entities capable of providing audible speech in said environment.

13. The method of claim 12, wherein said entities are phonemes.

14. The method of claim 12, wherein said selecting from the various entities takes into account the hearing capability of a listener of said speech.

15. The method of claim 12, wherein said characteristic properties correspond to the spectral properties relating to said entities when said entities are employed to synthesize one or more predetermined test sounds.

16. The method of claim 15, wherein said selecting from the various entities comprises determining the spectral difference between one or more of said characteristic properties, and spectral properties relating to ambient noise in said environment.

17. The method of claim 1, wherein selecting the approach comprises:

learning the approach predetermined to be best for said environment.

18. The method of claim 17, wherein the predetermination is made through user testing.

19. The method of claim 18, wherein said testing is performed with users having normal hearing capability.

20. The method of claim 18, wherein said testing is performed with users having varying hearing impairments.

21. The method of claim 1, further comprising presenting said speech via a link.

22. The method of claim 21, wherein the determination further takes into account the bandwidth of said link.

23. The method of claim 21, wherein the determination further takes into account the connection type of said link.

24. The method of claim 21, wherein the determination further takes into account the characteristics of said link.

25. A system for configuring speech synthesis, comprising:

a memory having program code stored therein; and a processor operatively connected to said memory for carrying out instructions in accordance with said stored program code;

wherein said program code, when executed by said processor, causes said processor to perform the steps of:

based on a listening environment and an analysis of connection characteristics associated with presenting speech, selecting an approach from a plurality of approaches for presenting synthesized the speech in the environment; and presenting speech according to the selected approach; and based on natural language input related to a user's inability to understand the presented speech, selecting a second approach from the plurality of approaches and presenting the speech using the second approach.

26. The system of claim 25, wherein environment has ambient noise.

27. The system of claim 25, wherein the selected approach provides speech audible in said environment.

28. The system of claim 27, wherein the speech is audible to a listener of normal hearing capability.

29. The system of claim 27, wherein the speech is audible to a listener of abnormal hearing capability.

30. The system of claim 25, wherein said processor further performs the step of:

modifying said approach in accordance with instructions provided by a listener of said speech.

31. The system of claim 25, wherein said processor further performs the step of:

modifying said approach in accordance with instructions provided by a system administrator.

32. The system of claim 25, wherein said system is performed in response to a trigger.

33. The system of claim 32, wherein said trigger is an indication that said speech is not audible.

34. The system of claim 25, wherein said processor performs the steps periodically.

35. The system of claim 34, wherein processor performs the steps with a periodicity that prevents said approach from changing rapidly.

36. The system of claim 25, wherein selecting the approach comprises:

evaluating, in light of properties relating to said environment, characteristic properties relating to various entities employable in constructing synthesized speech;

selecting from said various entities, one or more entities capable of providing audible speech in said environment.

37. The system of claim 36, wherein said entities are phonemes.

38. The system of claim 36, wherein said selecting takes into account the hearing capability of a listener of said speech.

39. The system of claim 36, wherein said characteristic properties correspond to the spectral properties relating to said entities when said entities are employed to synthesize one or more predetermined test sounds.

40. The system of claim 39, wherein said selecting comprises determining the spectral difference between one or more of said characteristic properties, and spectral properties relating to ambient noise in said environment.

41. The system of claim 25, wherein selecting the approach comprises:

learning the approach predetermined to be best for said environment.

42. The system of claim 41, wherein the predetermination is made through user testing.

43. The system of claim 42, wherein said testing is performed with users having normal hearing capability.

44. The system of claim 42, wherein said testing is performed with users having varying hearing impairments.

45. The system of claim 25, wherein said processor further performs the step of presenting said speech via a link.

46. The system of claim 45, wherein the determination further takes into account the bandwidth of said link.

47. The system of claim 45, wherein the determination further taken into account the connection type of said link.

48. The system of claim 45, wherein the determination further takes into account the characteristics of said link.

49. A computer-readable medium storing instructions for controlling a computing device to configuring speech synthesis, the instructions comprising:

based on a listening environment and an analysis of connection characteristics associated with presenting speech, selecting an approach from a plurality of approaches for presenting the speech in the environment;

presenting speech according to the selected approach; and based on natural language input related to a user's inability to understand the presented speech, selecting a second approach from the plurality of approaches and presenting the speech using the second approach.

50. The computer-readable medium of claim 49, wherein environment has ambient noise.

51. The computer-readable medium of claim 49, wherein the determined approach provides speech audible in said environment.

52. The computer-readable medium of claim 51, wherein the speech is audible to a listener of normal hearing capability.

53. The computer-readable medium of claim 51, wherein the speech is audible to a listener of abnormal hearing capability.

54. The computer-readable medium of claim 49, wherein the natural language input comprises further comprises explicit instructions to modify the determined approach.

55. The computer-readable medium of claim 49, the instructions further comprising:

modifying said approach in accordance with instructions provided by a system administrator.

56. The computer-readable medium of claim 49, wherein said method is performed in response to a trigger.

57. The computer-readable medium of claim 56, wherein said trigger is an indication that said speech is not audible.

58. The computer-readable medium of claim 49, wherein said method is performed periodically.

59. The computer-readable medium of claim 58, wherein the instructions are performed with a periodicity that prevents said approach from changing rapidly.

60. The computer-readable medium of claim 49, wherein the step of selecting the approach further comprises:

evaluating, in light of properties relating to said environment, characteristic properties relating to various entities employable in constructing synthesized speech;

selecting, from said various entities, one or more entities capable of providing audible speech in said environment.

61. The computer-readable medium of claim 60, wherein the step of selecting from the various entities takes into account the hearing capability of a listener of said speech.

62. The computer-readable medium of claim 60, wherein said characteristic properties correspond to the spectral properties relating to said entities when said entities are employed to synthesize one or more predetermined test sounds.

63. The computer-readable medium of claim 62, wherein the step of selecting from the various entities comprises determining the spectral difference between one or more of said characteristic properties, and spectral properties relating to ambient noise in said environment.

64. The computer-readable medium of claim 49, wherein the step of selecting the approach further comprises learning the approach predetermined to be best for said environment.

65. The computer-readable medium of claim 64, wherein the predetermination is made through user testing.

66. The computer-readable medium of claim 65, wherein the testing is performed with users having normal hearing capability.

67. The computer-readable medium of claim 66, wherein the testing is performed with users having varying hearing impairments.

68. The computer-readable medium of claim 49, further comprising presenting said speech via a link.

69. The computer-readable medium of claim 68, wherein selecting the approach further takes into account the bandwidth of said link.

70. The computer-readable medium of claim 68, wherein selecting the approach further takes into account the connection type of said link.

71. The computer-readable medium of claim 68, wherein selecting the approach further takes into account the characteristics of said link.

* * * * *